(12) United States Patent
Krause

(10) Patent No.: US 11,324,205 B2
(45) Date of Patent: May 10, 2022

(54) SYSTEM AND METHOD FOR FEEDING HONEYBEES USING A FEEDING DEVICE

(71) Applicant: Michael A. Krause, Brodhead, WI (US)

(72) Inventor: Michael A. Krause, Brodhead, WI (US)

( * ) Notice: Subject to any disclaimer, the term of this patent is extended or adjusted under 35 U.S.C. 154(b) by 0 days.

(21) Appl. No.: 17/138,375

(22) Filed: Dec. 30, 2020

(65) Prior Publication Data

US 2021/0337774 A1   Nov. 4, 2021

Related U.S. Application Data

(60) Provisional application No. 63/019,640, filed on May 4, 2020.

(51) Int. Cl.
| | | |
|---|---|---|
| *A01K 53/00* | (2006.01) | |
| *A01K 47/06* | (2006.01) | |
| *A23K 20/163* | (2016.01) | |

(52) U.S. Cl.
CPC .............. *A01K 53/00* (2013.01); *A01K 47/06* (2013.01); *A23K 20/163* (2016.05)

(58) Field of Classification Search
CPC .... A01K 47/06; A01K 53/00; A47G 2200/02; A47G 19/02; B65D 83/0005
USPC ................ 119/6.5; 449/48, 9; 220/560, 574; 222/205, 386
See application file for complete search history.

(56) References Cited

U.S. PATENT DOCUMENTS

| | | | | |
|---|---|---|---|---|
| 226,665 | A * | 4/1880 | Love ...................... | A47G 19/02 220/574 |
| 334,914 | A * | 1/1886 | N. Ward ................ | A01K 53/00 449/10 |
| 562,853 | A * | 6/1896 | Rooker .................. | A01K 53/00 449/10 |
| 623,360 | A * | 4/1899 | Foster .................... | A01K 53/00 449/10 |
| 968,613 | A * | 8/1910 | Van Ostrand .......... | A01K 39/02 119/72 |
| 1,065,823 | A * | 6/1913 | Matthews ............. | G01F 11/286 222/205 |

(Continued)

FOREIGN PATENT DOCUMENTS

| | | | |
|---|---|---|---|
| CN | 109618982 | 4/2019 | |
| DE | 29806000 U1 * | 7/1998 | ............. A01K 53/00 |

(Continued)

OTHER PUBLICATIONS

English-language translation of CN 109618982 (A) (Year: 2019).*

*Primary Examiner* — Lisa L Tsang
(74) *Attorney, Agent, or Firm* — Houda El-Jarrah; Bold IP, PLLC

(57) ABSTRACT

A feeding device for honeybees is described that can be used when open feeding honeybees using a container. The container is filled with liquid syrup. The feeding device can be placed over the liquid syrup. The feeding device includes several feeding holes on the surface of the liquid syrup. The honeybees can land on top of the surface of the feeding device and can drink the liquid syrup by reaching through the feeding holes on the feeding device. The feeding device prevents the honeybees from drowning in the liquid syrup and provides a safe surface for multiple honeybees to land on while open feeding.

5 Claims, 13 Drawing Sheets

(56) References Cited

U.S. PATENT DOCUMENTS

| | | | | |
|---|---|---|---|---|
| 1,406,568 A | * | 2/1922 | Lubben | A01K 53/00 449/48 |
| 1,414,284 A | * | 4/1922 | Griffith | A01K 53/00 449/9 |
| 1,566,571 A | * | 12/1925 | Appleton | A01K 39/026 119/77 |
| 1,801,932 A | * | 4/1931 | Miller | A01K 39/026 119/77 |
| 2,492,468 A | * | 12/1949 | Durben | A01K 53/00 449/9 |
| 2,496,285 A | * | 2/1950 | Goebel | A01K 53/00 449/11 |
| 3,589,340 A | * | 6/1971 | Beliles | A01K 5/0114 119/61.54 |
| 3,598,278 A | * | 8/1971 | Vann, Jr. | A47G 19/02 220/574.1 |
| 3,961,443 A | * | 6/1976 | Insalaco | A01G 9/00 47/32 |
| D251,347 S | * | 3/1979 | Andersen | D7/584 |
| 4,977,703 A | * | 12/1990 | Blanc | A01G 13/0281 47/30 |
| 5,139,166 A | * | 8/1992 | Smith | A47G 19/30 220/23.83 |
| D424,250 S | * | 5/2000 | Clifton | D30/123 |
| 6,830,499 B1 | | 12/2004 | Wills | |
| 7,568,308 B2 | * | 8/2009 | Stearns | A01G 13/0281 47/20.1 |
| 8,381,440 B1 | * | 2/2013 | Jabs | A01G 13/0281 47/66.7 |
| 8,887,665 B2 | * | 11/2014 | Rocker | A01K 5/0114 119/61.2 |
| 2003/0218016 A1 | * | 11/2003 | Iskierka | A47G 19/2211 220/216 |
| 2007/0056519 A1 | * | 3/2007 | Palmer | A01K 45/002 119/57.8 |
| 2011/0094449 A1 | * | 4/2011 | George | A01K 39/012 119/61.1 |
| 2015/0122184 A1 | * | 5/2015 | Donegan | F16M 13/02 119/51.01 |
| 2015/0373929 A1 | * | 12/2015 | Davenport | A47G 33/12 47/32.6 |
| 2016/0374312 A1 | * | 12/2016 | Tharp | A01K 5/0114 119/51.5 |
| 2018/0084763 A1 | | 3/2018 | Solano | |
| 2019/0014752 A1 | * | 1/2019 | Coyne | A01K 53/00 |
| 2019/0274288 A1 | * | 9/2019 | Cargill | A01K 53/00 |
| 2020/0267946 A1 | * | 8/2020 | Struhl | A01K 53/00 |

FOREIGN PATENT DOCUMENTS

| | | | | |
|---|---|---|---|---|
| DE | 202015007402 U1 | | 12/2015 | |
| FR | 2786983 A1 | | 6/2000 | |
| GB | 427447 A | * | 4/1935 | A47G 19/12 |
| GB | 462197 A | * | 3/1937 | A01K 53/00 |

* cited by examiner

SYSTEM AND METHOD FOR FEEDING HONEYBEES USING A FEEDING DEVICE

CROSS-REFERENCE TO RELATED APPLICATIONS

This application is a non-provisional application which claims priority to U.S. Provisional Patent Application No. 63/019,640 filed on May 4, 2020, which is incorporated in its entirety.

FIELD OF THE DISCLOSURE

The present invention relates to one or more systems and methods for feeding honeybees. More specifically, the present invention relates to one or more systems and methods for feeding honeybees using a feeding device configured to be placed over liquid syrup in an open top container.

BACKGROUND

Apiculture, which is the maintenance of honeybees and hives, provides farmers and hobbyists with a variety of embedded business benefits including the production of beeswax, honey and other edible bee products, crop pollination services, and the sale of honeybees to other beekeepers. A great deal of time and effort is required to take proper care of beehives and honeybees. One of the main issues with beekeeping that is true for any beekeeper is making sure that the honeybees are well-fed so as to produce a sufficient amount of honey and to maintain the health and happiness of the honeybees.

In an ideal world, the honeybees can forage for their own food by extracting nectar from nearby flowers. Honeybees use what is known as a proboscis to extract nectar from a flower. A proboscis is sometimes also referred to as a honeybee's tongue, but it is essentially an elongated tube attached to the honeybee's mouth and is used to suck up nectar from a flower. Over time, honeybees have evolved so that they are experts at foraging for nectar from a variety of flowers.

Nevertheless, there are many reasons why beekeepers may still need to supplement the foraging efforts of their honeybees to obtain nutrition or else their honeybees will not thrive. For example, in rainy weather, honeybees are unable to fly far and forage, because honeybees have to avoid getting wet. A honeybee instinctually avoids having its legs or other body parts become wet as this may be difficult to dry or clean off. In most cases, if a honeybee gets wet, it will die. Typically, on rainy days, honeybees stay in their hives.

Additionally, in cool or cold weather, such as in winter, honeybees may also not be able to locate enough flowers near the hive to provide enough nectar as flowers do not grow well in winter or cold conditions in many regions of the world. Even in spring and summer, when the weather is warmer and not as cool, honeybees may still need their food source to be supplemented as there may be an insufficient flower source depending on the location of the honeybee hive and the number of flowers and honeybees in the area.

Accordingly, beekeepers often supplement the food and energy supply for their honeybees using a method known as "open feeding." Open feeding of honeybees entails the placement of some amount of liquid sugar water or syrup in a container and allowing the honeybees to swarm and drink from the liquid syrup in the open container. The beekeepers may provide this container in a covered area to avoid the honeybees from getting wet and so that they stay warm.

Typically, beekeepers will use a standard 55 gallon (or other size) barrel or bucket. The beekeepers fill the container with the liquid syrup. Alternatively, beekeepers may use a 5 gallon bucket or pail that is easy to carry and fill with the liquid syrup. Beekeepers may tend to use these types of standard containers, but other sized containers may also be used. For example, some beekeepers often choose to fill birdbaths with liquid syrup so that the honeybees may be attracted to and feed off of the liquid syrup in the birdbath.

During open feeding, the honeybees are allowed to swarm and gather over the liquid syrup and eat their fill. However, a major problem with open feeding is that a large number of honeybees end up drowning in the liquid syrup. This is a huge loss for the beekeeper who is trying to take care of the honeybees as well as trying to obtain a profit with the byproducts of the honeybees. The problem with open feeding is that many of the honeybees land directly on the surface of the liquid syrup and drown in the liquid syrup while trying to feed. Often, the honeybees crowd together over the liquid syrup in a frenzy which also contributes to the honeybees drowning in the liquid syrup, which is very disappointing and distressing to the beekeeper. Even if the honeybees do not drown in the liquid syrup, the liquid syrup should not contact the bodies of the honeybees, as it can cause them to die at a later point in time also.

Beekeepers try to minimize this problem by including objects in the container that the honeybees can land on. Such objects may include easy to find items such as sticks, rocks, hay or straw, or anything that may fit inside the container and still provide access to some of the liquid syrup. Unfortunately, this solution is still inadequate as many honeybees are unable to access the liquid syrup in sufficient numbers from these objects and still end up drowning or covered in liquid syrup and dying later on.

There are some existing feeders that may be used directly in the hive of the honeybees for closed feeding. Closed feeding relates to the use of feeding devices that can be placed either at the entrance of the hive or within the hive for the honeybees to feed from. Closed feeding is different from the open feeding method described above whereby a regular container is filled with liquid syrup that the honeybees swarm over by leaving their beehive.

Alternatively, some open feed systems exist, but they require their own special containers that have to be purchased and are specially designed to hold liquid syrup and to allow honeybees to feed from a surface of the special container that gives access to an underlying amount of liquid syrup. These systems require a special container in order to function.

There is not an existing option for a feeding device that can be placed in any open container, in particular, any generic barrel or bucket that the beekeeper may already have in his inventory that provides access to any underlying liquid syrup within the open container. Accordingly, there is still an unsolved need for a feeding device and system that can be used in open feeding of honeybees that will prevent honeybees from drowning in or contacting the liquid syrup, even if the liquid syrup is provided for in a standard, commercially available barrel, bucket, or other type of container. The one or more systems and methods disclosed herein address these and other needs.

SUMMARY

One or more embodiments herein relates to a feeding device for feeding honeybees. The feeding device may include a raised wall area and a feeding surface, whereby the feeding surface is lower than the highest edge of the raised wall area, and whereby the raised wall area continuously encircles or surrounds the feeding surface. The feeding device may include a plurality of openings dispersed over the feeding surface, whereby the plurality of openings extends from the feeding surface through to a bottom surface of the feeding device and a plurality of spaces in between each opening of the plurality of openings. The plurality of spaces may provide a standing area or supportive surface for each honeybee. The feeding device is configured to float or rest on a surface of liquid syrup that is located within a container, whereby the honeybees may feed on the liquid syrup by inserting their proboscises into an opening of the plurality of openings located on the feeding surface of the feeding device.

One or more embodiments described herein may relate to a system for feeding honeybees. The system may include a container, whereby the container is configured to hold liquid syrup designated for open feeding the honeybees. The container may have an open top surface and a closed bottom surface with one or more adjoining side walls. The system may include a feeding device such as the feeding device described above.

The present description may further include an exemplary method for feeding honeybees during open feeding. The method may include providing a feeding device having a feeding surface, a plurality of openings disposed on the feeding surface, whereby the plurality of openings extend from the feeding surface through to a bottom surface of the feeding device, and a plurality of empty spaces in between each opening of the plurality of openings. The method may include placing the feeding device over a surface of liquid syrup located within a container and allowing honeybees to feed on the feeding device, whereby the liquid syrup is accessible to the honeybees from the plurality of openings. The body of each honeybee is prevented from drowning in or otherwise contacting the liquid syrup by the feeding device.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
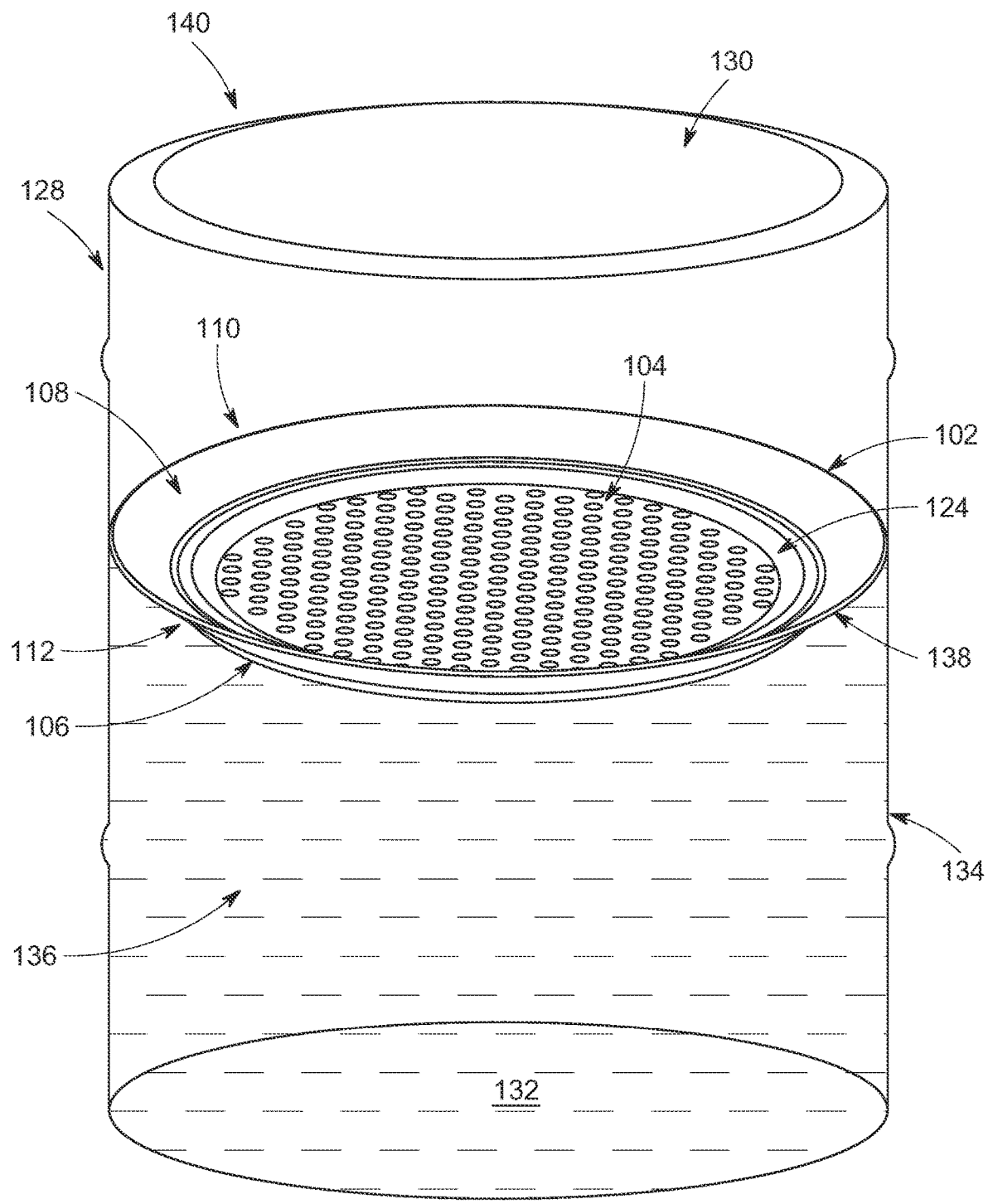
FIG. 1 is a pictorial illustration of a system for feeding honeybees during open feeding in accordance with an illustrative embodiment.
Figure 2:
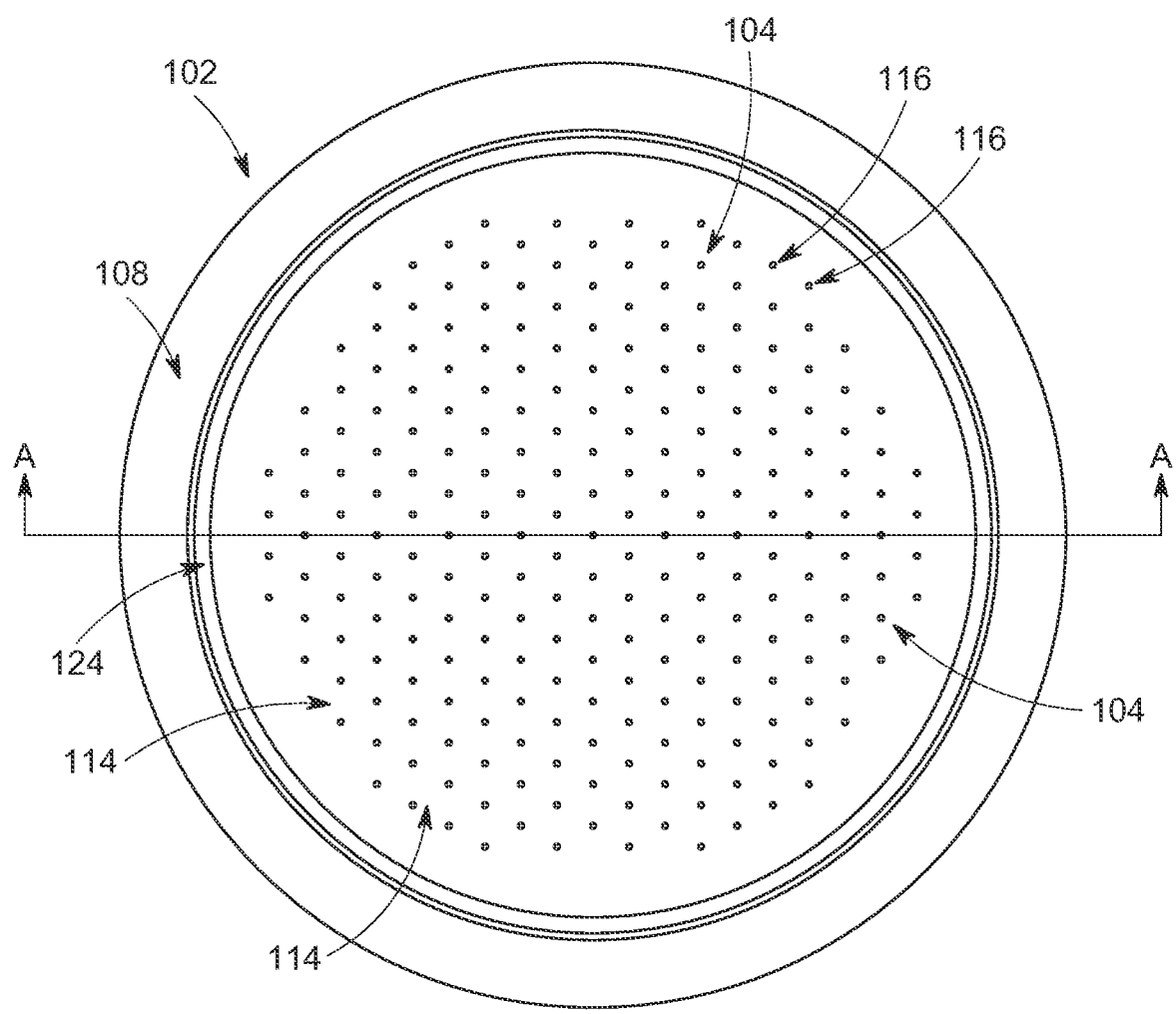
FIG. 2 is a top view of a feeding device in accordance with an illustrative embodiment.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The present disclosure is generally drawn to various embodiments for one or more systems for feeding honeybees using an open feeding method. In particular, the present disclosure describes, in one or more non-limiting embodiments, a system and method to allow honeybees to open feed from a container, such as a barrel, bucket, or other container, without risking a large number of honeybees drowning or making contact with the liquid syrup that is provided in the container. The feeding device allows the honeybees to use their proboscises to extract the liquid syrup from the container via the plurality of openings dispersed over a top surface of the feeding device.

Advantageously, the one or more feeding devices and systems described herein may help the beekeeper who is financially invested or otherwise invested in taking proper care of his or her hive and who wants to use open feeding to feed the honeybees without risking their deaths from drowning or otherwise contacting the liquid syrup with their bodies. Greater detail is provided below about the various methods and systems for doing so in relation to the Figures.

FIG. 1 illustrates one or more non-limiting embodiments for a feeding device that may be used in a standard container. FIG. 1 displays a feeding device 102 and a storage container 128 in which feeding device 102 is positioned. Feeding device 102 may be used to provide a safe surface for the honeybees to land on and to access the underlying liquid syrup 136 that has been poured and contained in storage container 128.

FIGS. 2-6 provide various views that will be further described below as well. As shown in FIG. 1, feeding device 102 is configured to be placed on and float over any liquid syrup 136 that has been filled in a storage container, such as storage container 128. Storage container 128 may interchangeably be referred to herein as "container." Feeding device 102 is shown as a single whole piece. As will be discussed in FIGS. 8-12, in some embodiments, feeding device 102 may include one or more individual pieces that need to be assembled together or connected together to form a single feeding device 102. In other embodiments, the user may be provided with a feeding device 102 that has been manufactured as a whole integral piece that does not need assembling.

The liquid syrup 136 within the storage container 128 as illustrated in FIG. 1 is designed to attract and feed honeybees (e.g., honeybee 150 shown in FIG. 7) from nearby hives who are able to naturally smell the liquid syrup 136. Liquid syrup 136 may also be interchangeably referred to as "sugar water" or "liquid sugar water." Liquid syrup 136 is usually a mixture of water and sugar. The mixture of the liquid syrup 136 is often 1:1 combination of water and sugar, although other mixture amounts of the water to sugar ratio may be used as well. The liquid syrup 136 may be prepared in advance by the beekeeper and poured up to a desired level 138 in storage container 128 as shown in FIG. 1.

Storage container 128, as shown in FIG. 1, is a barrel or drum that is commonly used by beekeepers when using open feeding to supplement the nutrition and food sources for their honeybees. It is typical for a barrel or drum to be used when open feeding honeybees. Alternatively, storage container 128 may be any type of container, including buckets or pails or boxes or bowls available to the beekeeper. Advantageously, feeding device 102 does not require a specialized box or container to be purchased for feeding device 102. Notably, in a non-limiting embodiment, beekeepers may use feeding device 102 when open feeding his or her honeybees using the standard storage containers 128 commonly available to the beekeepers, such as a barrel, drum, bucket, or pail. In a non-limiting embodiment, container 128 may be a drum or barrel configured to hold 55 gallons of liquid. This is a common sized container 128 that many beekeepers use when open feeding.

It is noted that feeding device 102 may be manufactured having any shape or size to suit multiple sized and shaped containers 128. In a preferred embodiment, feeding device 102 has a circular profile, as shown in FIG. 1, in order to conform to the circular profile of the cylindrical container 128 shown in FIG. 1 or to conform to the circular profile of a 5-gallon bucket pail. However, it is noted, that feeding device 102 may be manufactured having alternatively shaped profiles or appearances, such that feeding device 102 may be manufactured to suit rectangular containers 128 or other shaped containers 128 in other configurations.

It is preferable that feeding device 102 has a diameter or width that fully extends between all sides of the storage container 128 so as to avoid the honeybees 150 falling off of the top rim 110 or sides of the feeding device 102 and into the underlying liquid syrup 136 where they are likely to drown. As shown in FIG. 1, the feeding device 102 may be in contact and abut each wall 134 of the storage container 128 so that there is less of a possibility that the honeybees 150 can fall into the underlying liquid syrup 136. The feeding device 102 may fit snugly within the container 128 as it may be sized per each standard container.

In one or more non-limiting embodiments, storage container 128 (e.g., as shown in FIG. 1) may include an opening 130 at the top 140 of the storage container 128 through which items or liquids (e.g., such as liquid syrup 136) may be placed or poured into storage container 128. Storage container 128 may further include a closed bottom 132 with one or more side walls 134, as shown in FIG. 1, extending upwards and having inside and outside surfaces.

As shown in FIG. 1, in one or more non-limiting embodiments, feeding device 102 is intended to float or rest on the surface 138 of any liquid syrup 136 located in the storage container 128. Feeding device 102, in one or more non-limiting embodiments, may include a feeding surface, such as feeding surface 104 that is connected to one or more raised wall areas 108. The feeding surface 104 may also be referred to interchangeably as the top surface of the feeding device 102.

As shown in FIG. 1, the feeding surface or top surface 104 may be at a lower level than the top rim 110 of the raised wall area 108. As shown in FIGS. 1-12, in one or more non-limiting embodiments, the raised wall area 108 may angle outwardly (e.g., angle 402 shown in FIG. 4) from the feeding surface 104. Further, as shown in FIG. 5, which provides a sectional view of the feeding device 102, the raised wall area 108 may have a thickness 112 that increases in the direction towards the feeding surface 104. In other words, the top rim 110 of the feeding surface 104 may have the smallest thickness 112 in comparison to the portion of the raised wall area 108 closest to the feeding surface 104, which may have the thickest thickness 112 as shown in FIG. 5. Accordingly, the thickness 112 of the feeding device 102 may increase from the raised wall area 108 towards the feeding surface 104 and the thickness 112 may not be uniform for the whole feeding device 102 in some embodiments. In other embodiments, the feeding device 102 may have a uniform thickness 112.

The raised wall area 108 may act as one of the many standing surfaces or supportive surfaces that the honeybees (e.g., honeybee 150 shown in FIG. 7) may use when trying to access the liquid syrup 136 from the feeding surface 104. As shown in FIGS. 1-6, whereby the raised wall area 108 is angled and may include an angle such as angle 402 shown in FIG. 4. It is intended that the honeybees 150 (e.g., as shown in FIG. 7) may use the exposed surface of the raised wall area 108 to stand on and walk on either towards or away from the feeding surface 104 of the feeding device 102. It may further be helpful to the honeybees if the raised wall surface 108 has a varying thickness 112, because the honeybees are able to use the raised wall area 108 as a wiper or a wiping surface.

Accordingly, if for some reason, any honeybees do contact any water (e.g., such as dew or rain or any other type of liquid) while flying into the storage container 128 or any liquid syrup 136, the honeybees may be able to use the raised wall area 108 to quickly wipe the water or liquid syrup 136 off of their legs or body. The varying thickness 112 of the feeding device 102 may also help the feeding device 102 be sturdier and more stable and to enable the feeding device 102 to float on the surface 138 of the liquid syrup 136. In alternative designs and embodiments, the raised wall area 108 of the feeding device 102 may have alternative shapes and configurations and may not necessarily be angled. For example, in some non-limiting embodiments, raised wall area 108 may have a straight wall surface that extends vertically up from the feeding surface 104.

Figure 3:
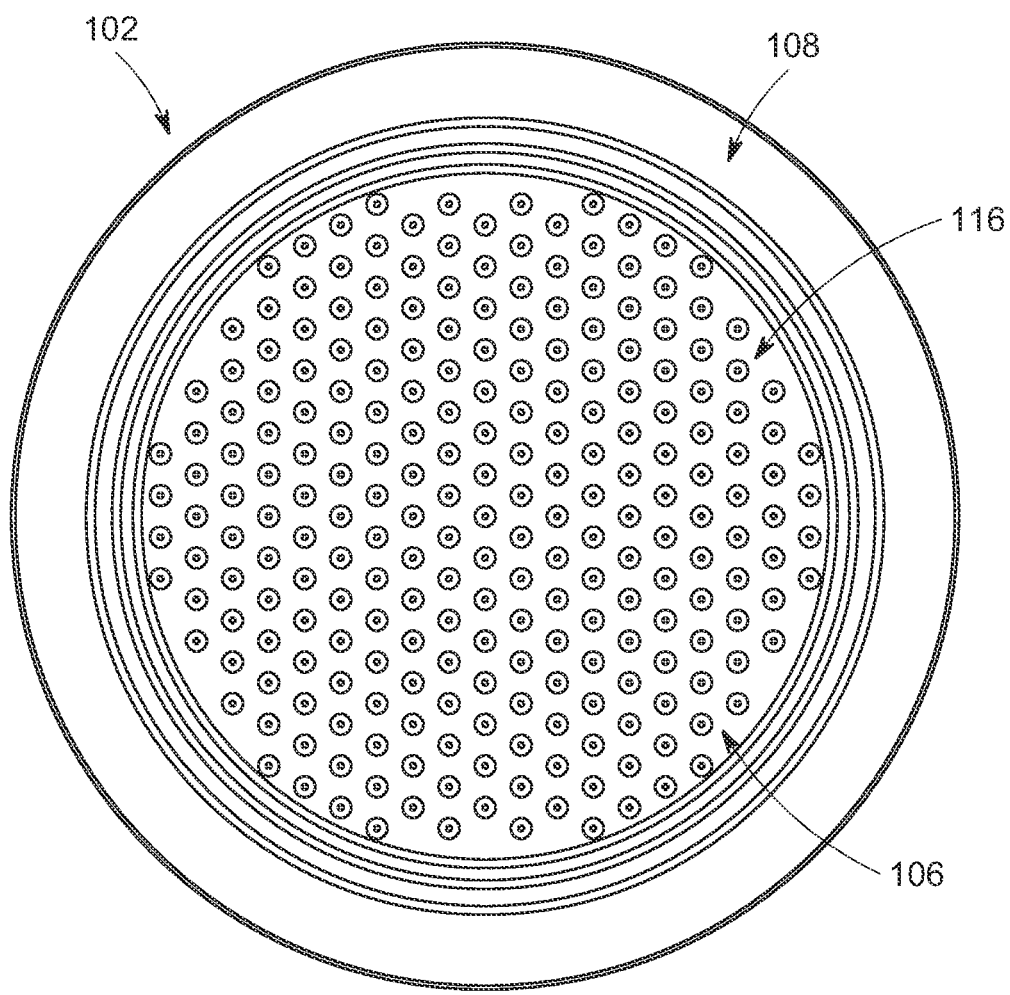
FIG. 3 is a bottom view of a feeding device in accordance with an illustrative embodiment.

As noted above, FIG. 2 shows a top view of the feeding device 102 and FIG. 3 shows a bottom view of the feeding device 102. In one or more non-limiting embodiments, it is intended for the honeybees 150 to be able to fly onto and land on the feeding surface 104 of the feeding device 102 where there are a plurality of openings 116 that provide limited access to the liquid syrup 136 located underneath the feeding device 102. The openings 116 on the top surface 104 of the feeding device 102 may also be referred to herein as feeding holes.

In one or more non-limiting embodiments, the feeding surface 104 includes the plurality of openings 116 as well as the empty spaces 114 located between each opening 116. The empty space 114 between each opening 116 provides a space for the honeybees to land or stand on. In some cases, the honeybees (e.g., honeybees 150 shown in FIG. 7) may choose to land and stand on the empty space 114 when leaning over to drink the liquid syrup 136 through each opening 116 as shown in an exemplary view in FIG. 7.

FIG. 7 shows an example of a honeybee 150 using the feeding device 102 as a support surface while leaning over and drinking the underlying liquid syrup 136 using the proboscis 152 as shown in FIG. 7. It is noted that the size of the honeybee 150 as shown in FIG. 7 is exaggerated and may not be shown to scale. Further, in reality, there will be many more honeybees 150 that congregate or swarm over the feeding device 102 to access the underlying syrup 136. There may be anywhere from dozens to hundreds or more honeybees 150 in the storage container 128 and over the feeding device 102 at any one time.

The openings 116 only provide limited access to the underlying liquid syrup 136 because the openings 116 are carefully designed and dimensioned so that only the proboscis (e.g., proboscis 152 as shown in FIG. 5) of the honeybee 150 is able to fit through the opening 116.

Figure 5:
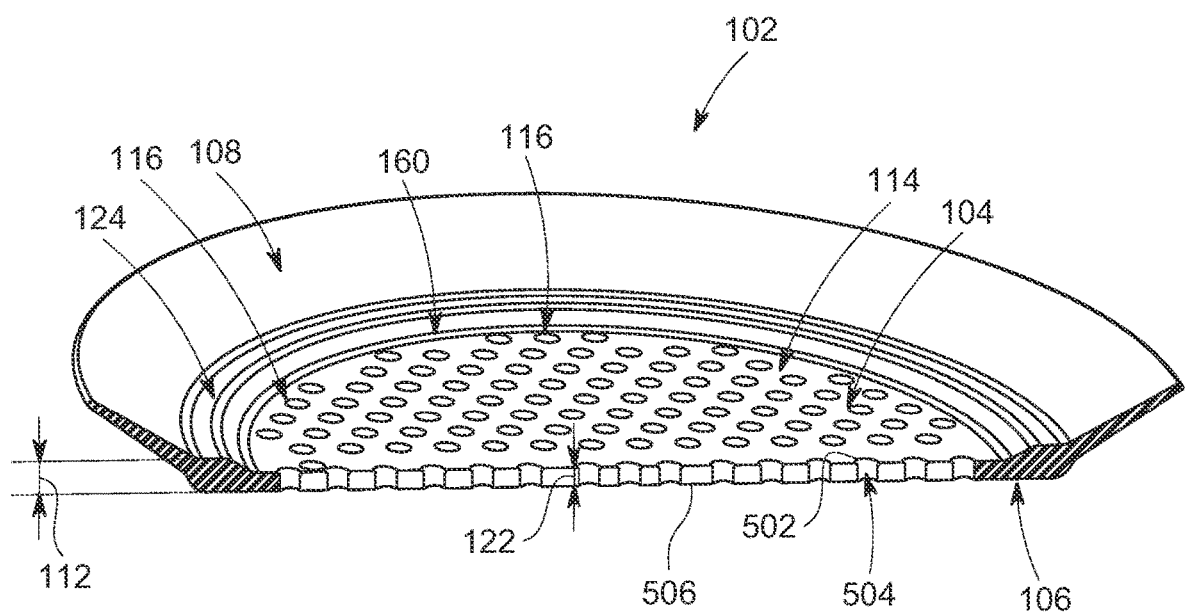
FIG. 5 is a sectional view of the feeding device taken along line A-A shown in FIG. 2 in accordance with an illustrative embodiment.
Figure 6:
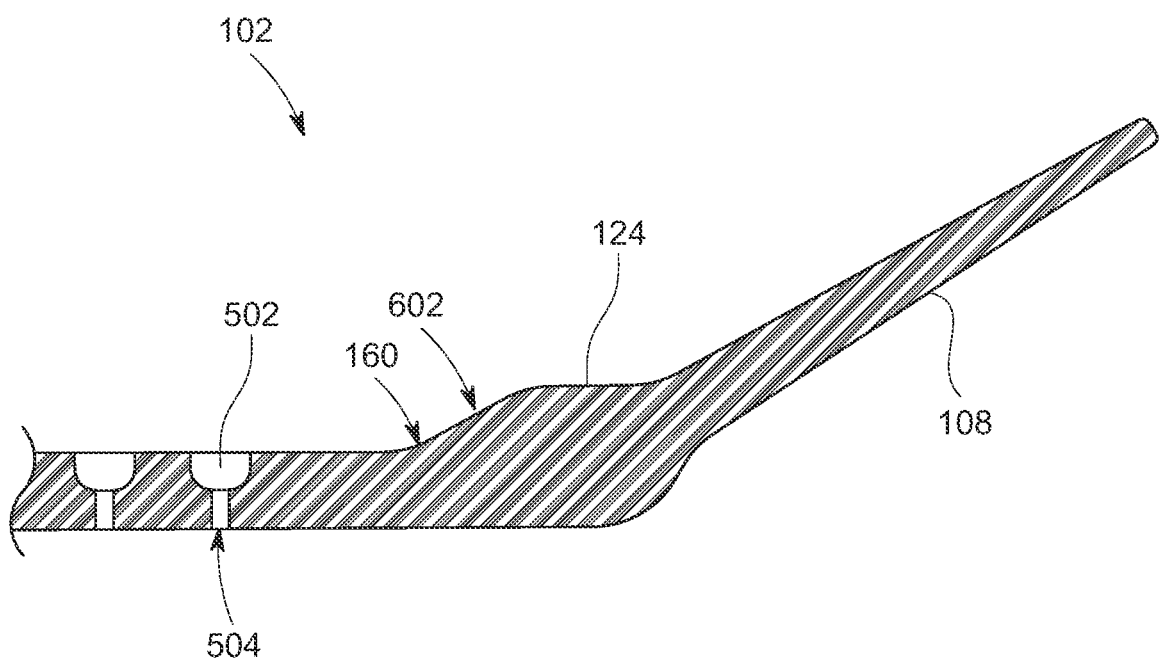
FIG. 6 is a partial sectional view of the feeding device taken along line B-B shown in FIG. 4 in accordance with an illustrative embodiment.
Figure 7:
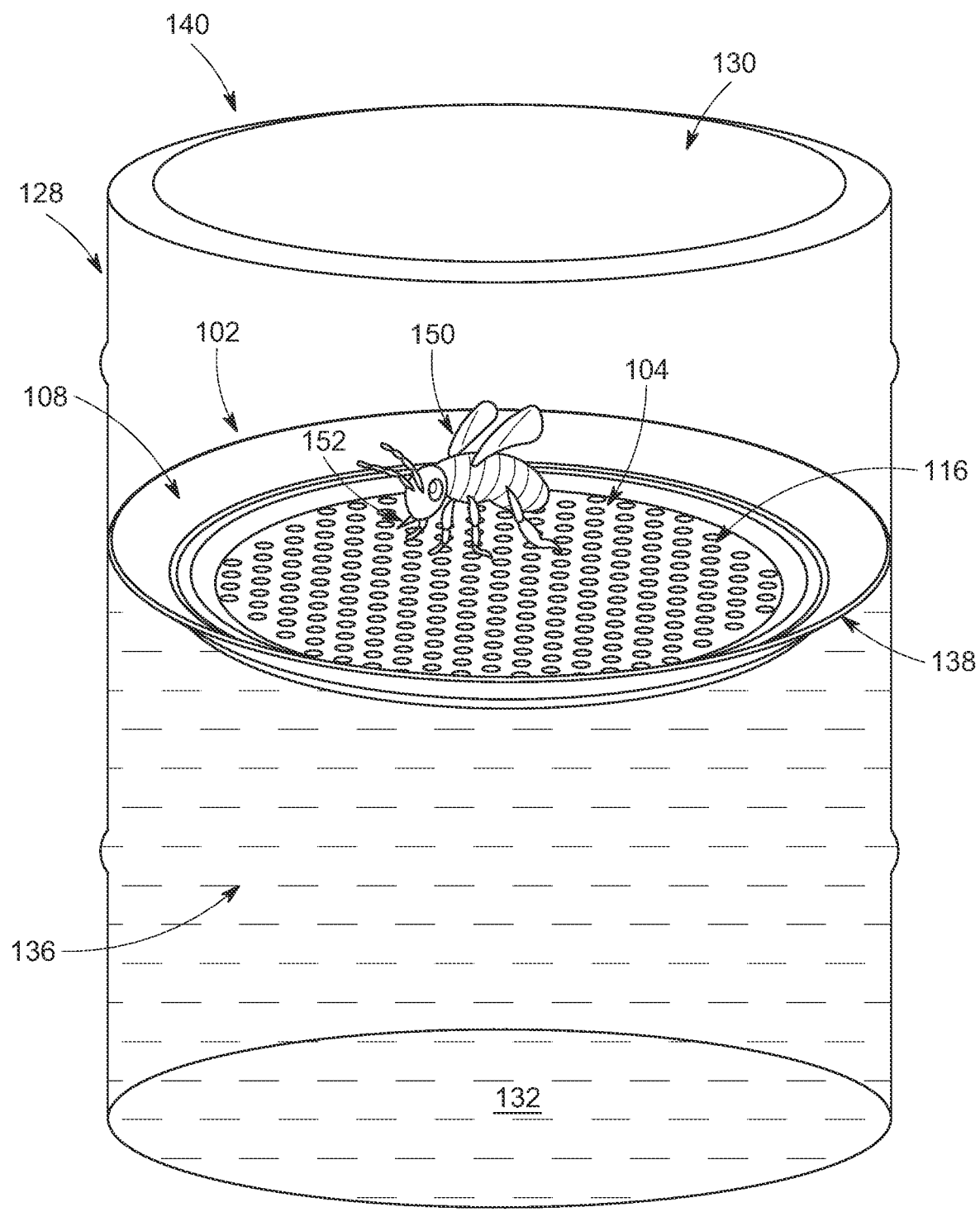
FIG. 7 is a pictorial illustration of a honeybee using a feeding device in a container for open feeding in accordance with an illustrative embodiment.

As shown in FIG. 5-FIG. 6, it is intended for the proboscis 152 of the honeybee 150 to fit through each opening 116 via top opening 502 and narrow channel 504 in order to safely access the underlying surface 138 of the liquid syrup 136 without having the legs, wings, or any other part of the body of the honeybee 150 making contact with the liquid syrup 136. The top opening 502 may also be described as an entry point in the claims below.

As described above, it is very undesirable for the remaining portions of the body of the honeybee 150 to contact the liquid syrup 136, which can prove fatal to the honeybee 150. In the absence of an object such as the feeding device 102, the honeybee 150 could easily drown in the liquid syrup 136, which defeats the purpose of using open feeding to feed the honeybees 150.

As shown in FIG. 5-6, in the sectional views of the feeding device 102, in a non-limiting embodiment, each opening 116 located on the feeding surface 104 includes a top opening 502 that is wider than the narrower channel 504 that connects with or merges with the top opening 502 of the opening or feeding hole 116. The top opening 502 may start at the top surface 104 of the feeding device 102 and merge with the narrower channel 504 that extends through to the bottom surface 106 of the feeding device 102 as shown in FIGS. 5-6. As shown in FIG. 5, there may be a space 506 that extends in the thickness 112 of the feeding device 102 and is a space between each opening 116. Each space 506 is the portion of the feeding device 102 within the body of the feeding device 102 that coincides with each space 114 located between each opening 116 on the feeding surface 104 of the feeding device 102.

As noted above, proboscis 152 is a long tube attached to the mouth of the honeybee 150 that can be extended and retracted by the honeybee 150 at will. The proboscis 152 in essence acts as a straw for pulling nectar out of objects (e.g., such as flowers). In this case, it is intended that the honeybee 150 use its proboscis 152 and extend its proboscis 152 into the depth 122 of the opening 116 through the wider top opening 502 and then through each narrow opening channel 504 as shown in FIGS. 5-6 and access the underlying liquid syrup 136 that rests just beneath the feeding device 102. It is noted in other non-limiting embodiments, each opening 116 may only have one long narrow channel (e.g., narrow channel 504) rather than having also a wider top opening 502.

In one non-limiting embodiment, the diameter of the top opening 502 may be approximately 0.24 inches and the diameter of the opening for the narrow channel 504 may be 0.06 inches, which would enable a honeybee 150 to insert their proboscis into the narrow channel opening 504 without allowing the liquid syrup 136 to touch the honeybee 150. These dimensions are purely exemplary and non-limiting, and other dimensions may be suitable for other sizes and arrangements of openings 116 in other embodiments.

It is noted that in some instances, the liquid syrup 136 may even fill up or be in fluid communication with the interior of the narrow channel 502 such that the liquid syrup 136 fills up into a portion of the narrow channel 504 so that it is even easier for the honeybee 150 to drink from the opening 116 while feeding device 102 floats on the surface 138 of the liquid syrup 136 in the container 128. Whether the liquid syrup 136 fills all or a portion of the narrow channel 504 and/or the top opening 502 of the plurality of openings 116, the liquid syrup 136 is intended to be accessible to the honeybees 150 from the plurality of openings 116.

Advantageously, the plurality of openings 116 are spread around over the feeding surface 104 and provides many access points for the many honeybees 150 that may swarm over and fly into the storage container 128 to access the underlying liquid syrup 136. In a preferred embodiment, there should be as many openings 116 located on the feeding surface 104 as possible to provide many access points for the honeybees 150. Additionally, there are multiple surface spots on the feeding device 102 that the honeybees 150 can gather and stand on, such as the raised wall area 108 as noted above as well as the free empty space 114 in between each opening 116 and the various ridges 124, 160 of the feeding device 102.

Any number of openings 116 may be included on the feeding surface 104 as shown in FIGS. 2-7 without limitation. The plurality of openings 116 extend from the feeding surface 104 through the body of the feeding device 102 and through the bottom surface 106 of the feeding device 102 as shown in FIG. 3, which shows a bottom view of the feeding device 102.

Figure 4:
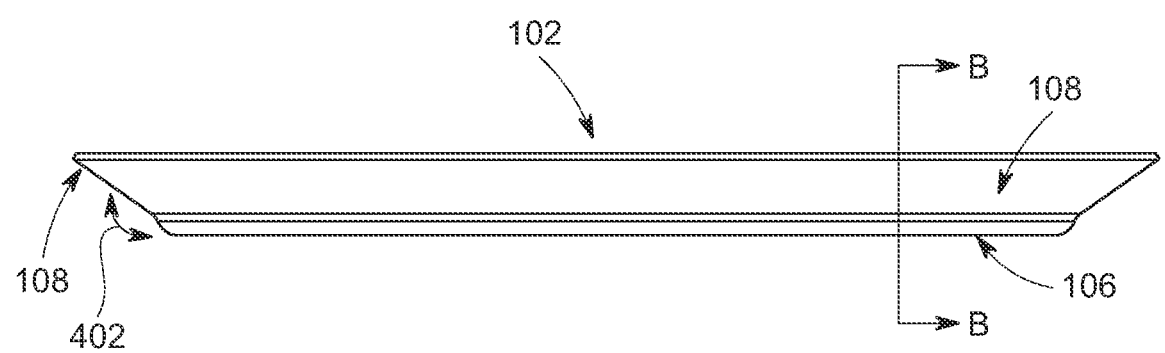
FIG. 4 is a side view of a feeding device in accordance with an illustrative embodiment.

As shown in FIGS. 4-6, there may be a top border or ridge 124 located between the portion of the raised wall area 108 that joins with the feeding surface 104. The ridge 124 may also be used by the honeybees 150 to stand on or to also wipe their bodies or legs. Further, in some embodiments, there may be a secondary bottom ridge 160, shown in FIGS. 5-6. The top ridge 124 may be located just below the angled raised wall area 108. The secondary ridge 124 may be located just above the second angled slope 602 of the feeding device 102 as shown in FIG. 6. Accordingly, the feeding device 102, in one or more non-limiting embodiments, may include one or more ridges such as ridges 124 and 160 that may have a flatter, planar portion and then angle towards the feeding device 102. In other embodiments, the ridges 124 and 160 may be curved or rounded.

In other embodiments, there may be either one ridge (e.g., either top ridge 124 or bottom ridge 160) or no ridges at all in the feeding device 102. The ridges 124, 160 are intended to provide further stability to the feeding device 102 and provide another supportive surface on which the honeybees 150 can stand on or walk over.

The feeding device 102 may be manufactured from a variety of materials without limitation. In one non-limiting embodiment, the feeding device 102 may be made of silicone type material or may incorporate silicone in some respects. In other embodiments, the feeding device 102 may be plastic (including silicone), rubber, wood, glass, or a combination thereof. The feeding device 102 is intended to be reusable and sturdy and may be cleaned as needed.

In one or more non-limiting embodiments, the feeding device 102 may be manufactured as a single, whole piece as shown in FIGS. 1-6. In other embodiments, the feeding device 102 may be assembled together from multiple pieces. FIGS. 8-12 provide detailed views of the various pieces that may be used to assemble a feeding device 102. In some instances, in order to make the manufacturing process more cost-effective in some cases, it may be beneficial to have the feeding device 102 formed after assembling one or more separate pieces together (e.g., as shown in FIGS. 8-12).

Figure 8:
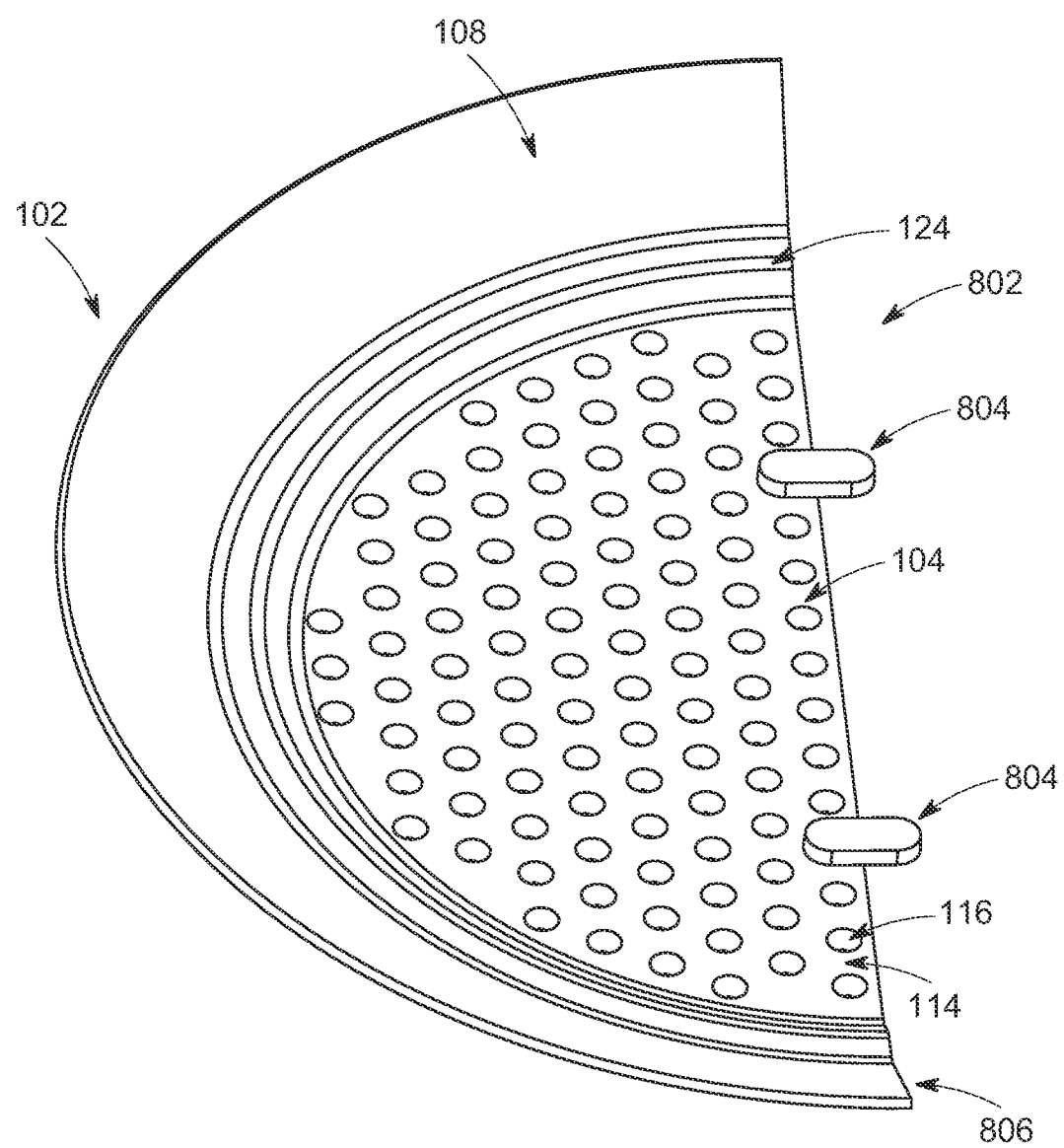
FIG. 8 is a top view of a first half piece for a feeding device in accordance with an illustrative embodiment.
Figure 9:
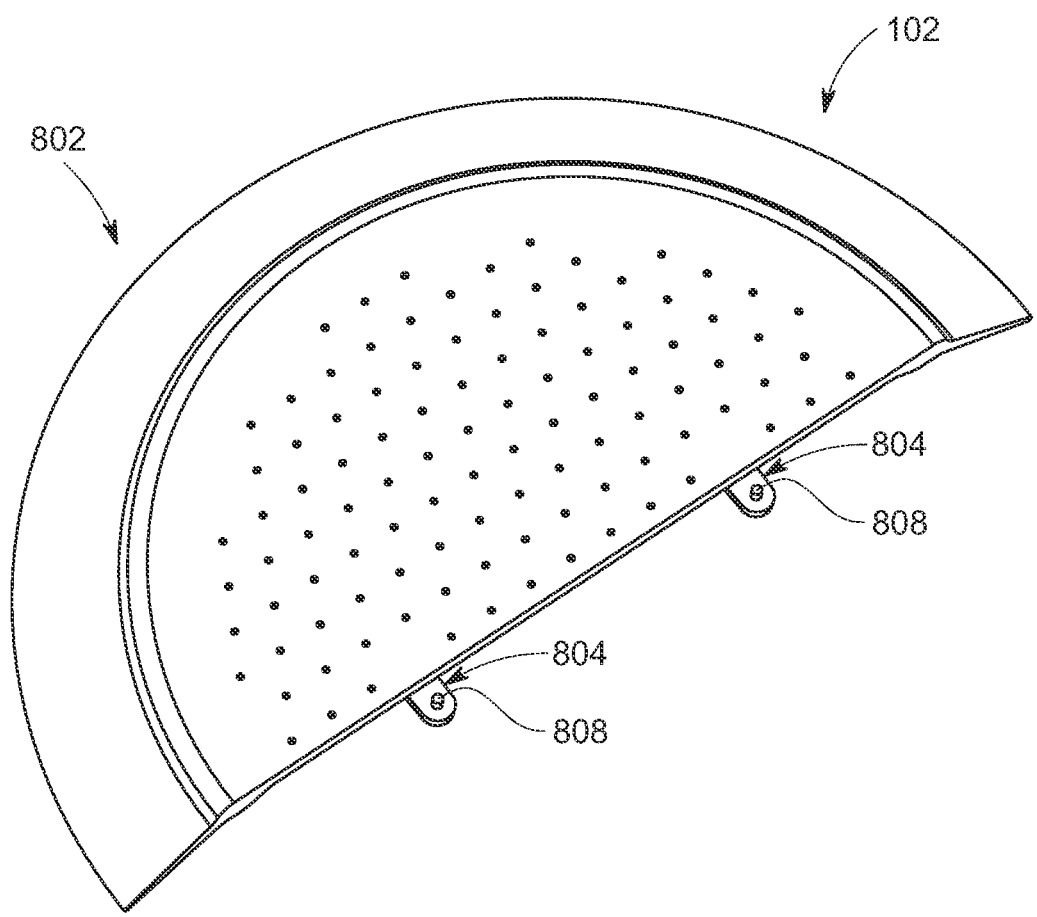
FIG. 9 is a bottom view of the first half piece for a feeding device shown in FIG. 8 in accordance with an illustrative embodiment.
Figure 10:
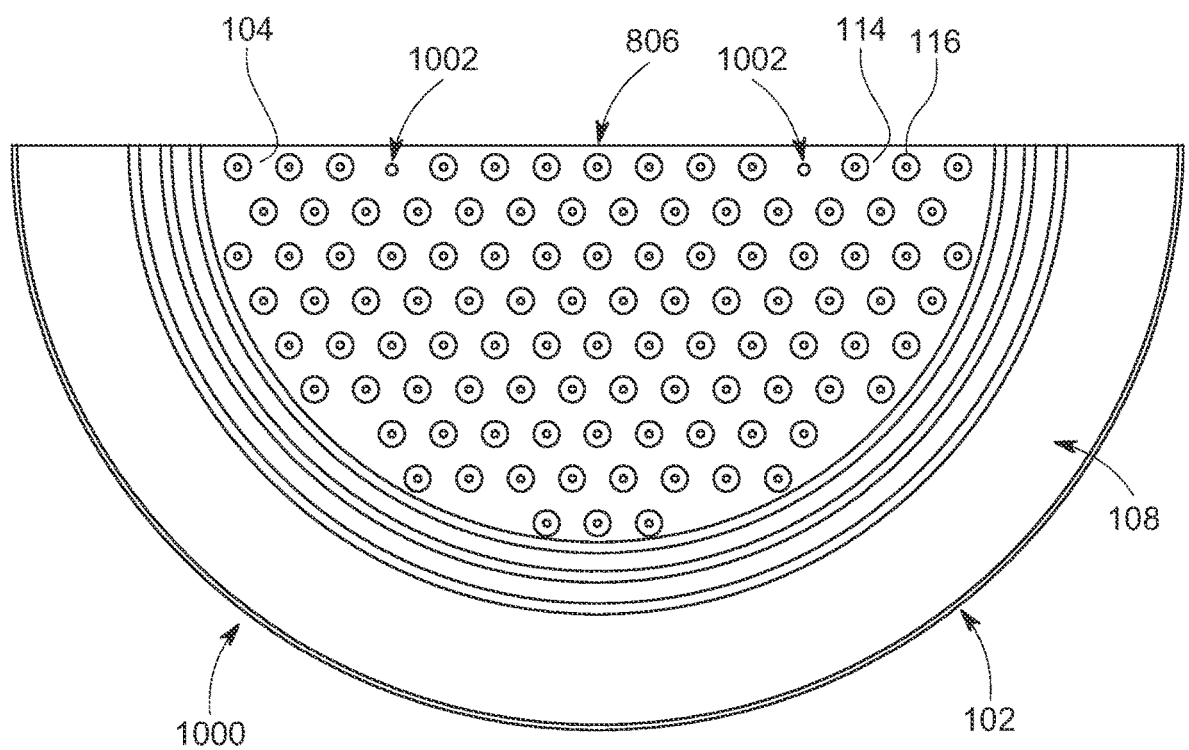
FIG. 10 is a second half piece for the feeding device shown in FIG. 8 in accordance with an illustrative embodiment.

FIGS. 8-10 represent one embodiment for a feeding device 102. Feeding device 102, as shown in FIGS. 8-10, comprises two half pieces that connect together to form a whole single piece that forms feeding device 102. FIGS. 8-9 show a first half piece 802 and FIG. 10 shows the complementary second half piece 1000 that can connect to the first half piece 802. Further, FIG. 8 shows a top view of the first half piece 802 and FIG. 9 shows a bottom view of the second half piece 802.

As shown in FIG. 8, the first half piece 802 includes two hook like pieces 804 located on an edge 806 of the first half piece 802. The term "hook" as used herein may interchangeably be used with the term "clasp." The hook pieces 804 are fastening type of devices and may have alternative designs and forms other than that shown in FIGS. 8-9. Any type of fastening device may be used alternatively to hook pieces 804 (or hook piece 1104 shown in FIGS. 11-12).

In a non-limiting embodiment, the hooks 804 may be located on the edge 806, whereby the edge 806 is located on the opposite side of the first half piece 802 from the raised wall area 108 of the feeding device 102. The hooks 804 are spaced some distance apart from one another as shown in FIG. 8. As shown in FIG. 9, from the bottom view of the first half piece 802, each hook 804 may include a protrusion 808 configured to hook onto another complementary second half piece 1000 of the feeding device 102.

FIG. 10 shows the second complementary half piece 1000 configured to connect to the first half piece 802 shown in FIGS. 8-9. In a non-limiting embodiment, the second half piece 1000 includes two receiving holes 1002 on an edge 806 of the second piece 1000 of the feeding device 102. The edge 806 on the second piece 1000 is opposite the side of the feeding device 102 where the raised wall 108 is located. Each half piece 802 and 1000 may include half of the total raised wall area 108 and the feeding device 102.

The hook protrusions 808 shown in FIG. 9 are intended to fit within the receiving holes 1002 shown on the second half piece 1000 shown in FIG. 10. In a non-limiting embodiment, the receiving holes 1002 may be positioned in between one or more openings 116 and may have ample room on each side for the size of the hook pieces 804 shown in FIGS. 8-9. Accordingly, to assemble feeding device 102 as a whole piece, the user or another entity (e.g., a manufacturer) may connect the first half piece 802 to the second half piece 1000. The plurality of holes 116 may still be dispersed over the feeding surface 104 of each half piece 802, 1000 and thus the functionality of the feeding device 102 is the same as noted above with respect to FIGS. 1-7, in which the honeybees 150 are able to feed on the underlying liquid syrup 136 beneath the feeding device 102 by inserting their proboscises 152 into the plurality of openings 116.

Figure 11:
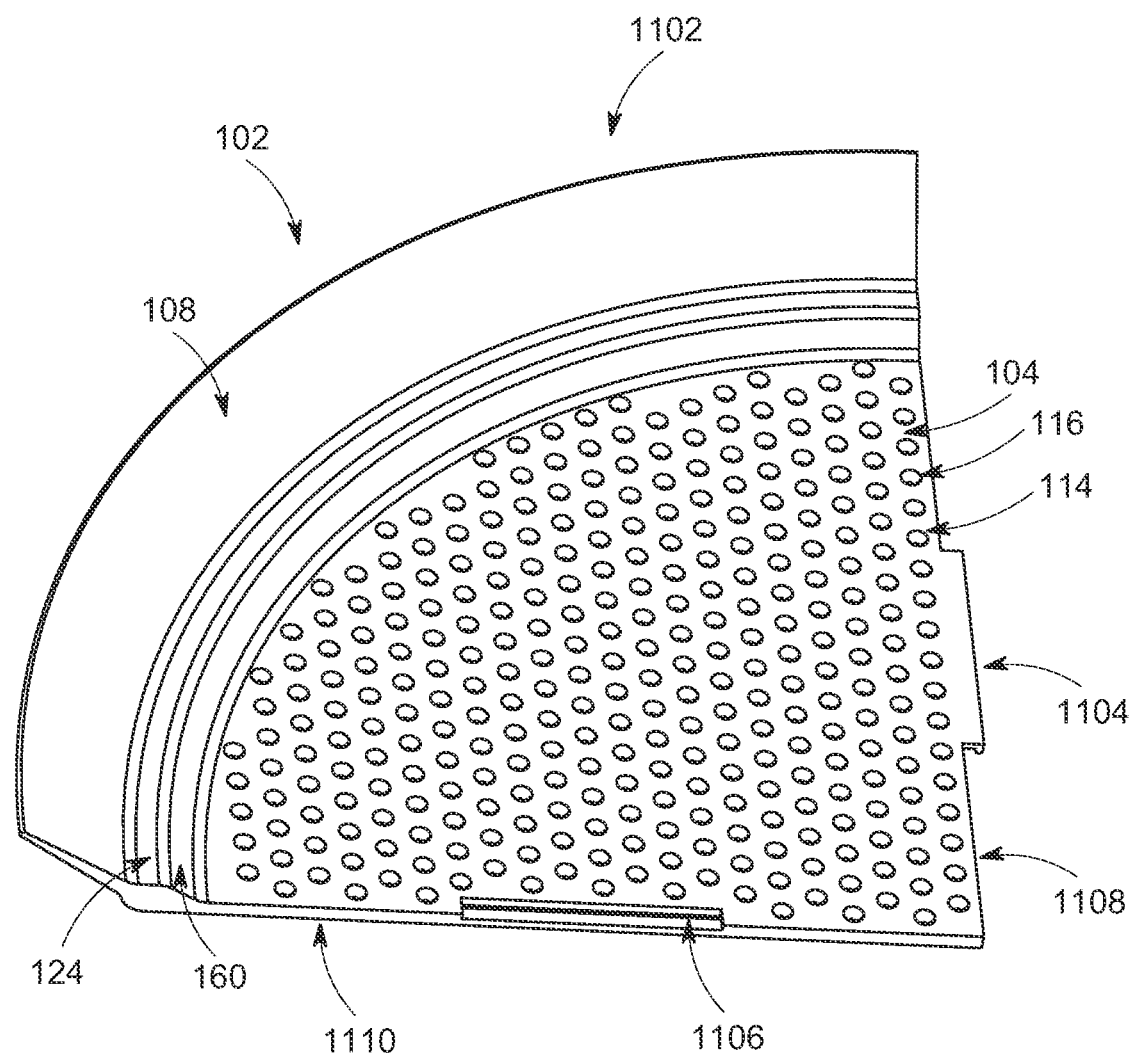
FIG. 11 is a top view of a quarter piece for a feeding device in accordance with an illustrative embodiment.
Figure 12:
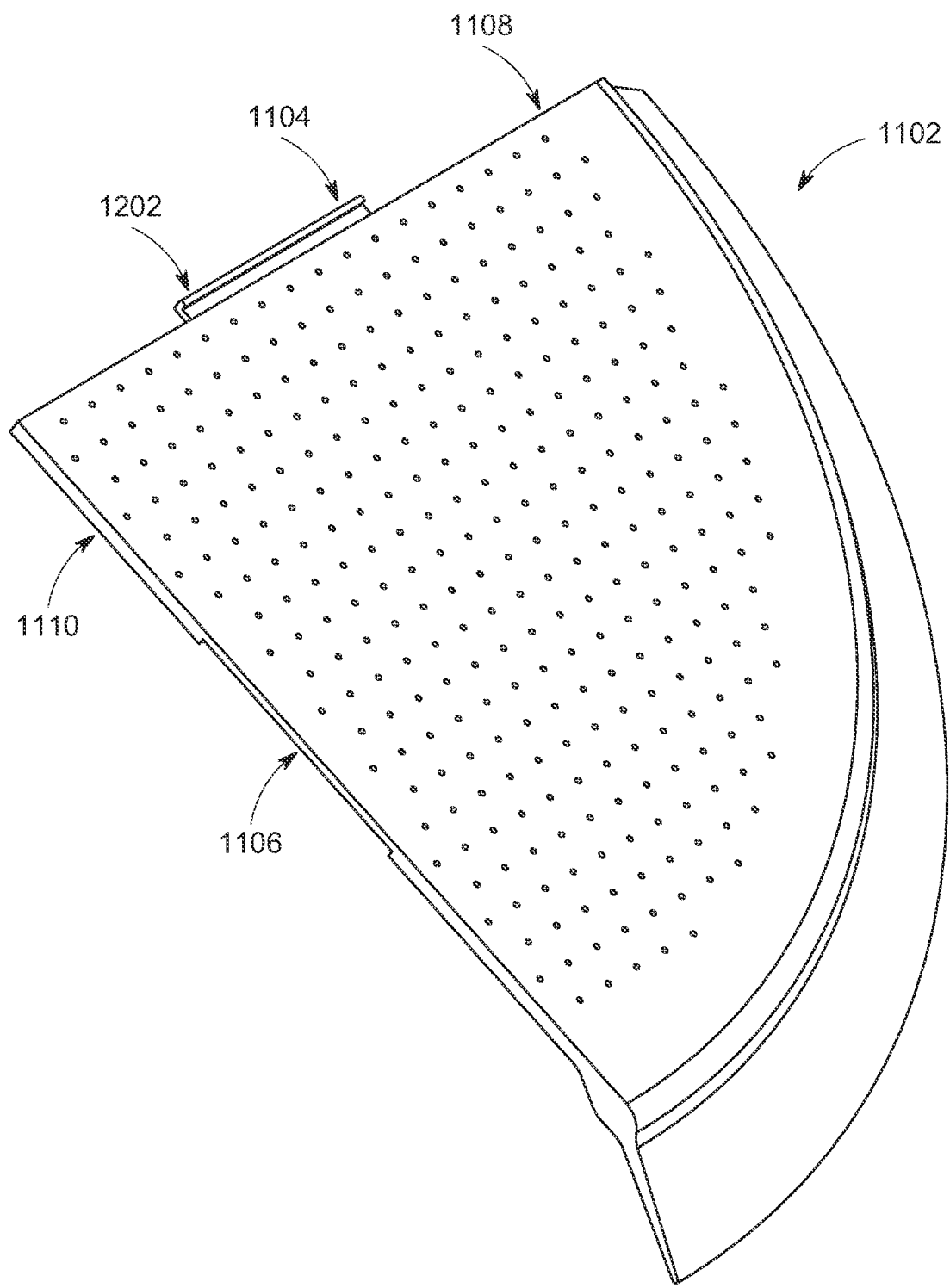
FIG. 12 is a bottom view of the quarter piece for the feeding device shown in FIG. 11 in accordance with an illustrative embodiment.

FIGS. 11-12 show another embodiment for feeding device 102 as composed of multiple quarter pieces 1102. Accordingly, the feeding device 102 may be assembled as a whole by connecting four quarter pieces 1102 in one or more non-limiting embodiments.

In a non-limiting embodiment, the quarter piece 1102 may include a raised wall area 108 that has been dimensioned to include a quarter of the whole raised wall area 108 of the feeding device 102. There may be a hook piece 1104 located on one side 1108 of the quarter piece 1102 and a receiving space 1106 located on another adjacent side 1110 of the quarter piece 1102. In a non-limiting embodiment, the hook piece 1104 may be rather rectangular and longer shaped and the receiving space 1106 may have a complementary shape in order for the hook piece 1104 to mate with or fit into the receiving space 1106. The hook piece 1104 is located on a different side 1108 than the receiving space 1106 which is located on an adjacent side 1110 in one or more non-limiting embodiments. The plurality of holes 116 may still be dispersed over the feeding surface 104 of each quarter piece 1102 and thus the functionality of the feeding device 102 is the same as noted above with respect to FIGS. 1-7, in which the honeybees 150 are able to feed on the underlying liquid syrup 136 beneath the feeding device 102 by inserting their proboscises 152 into the plurality of openings 116. The function and form of feeding device 102 is the same as described above even if the feeding device 102 is divided into pieces initially.

FIG. 12 shows a bottom view of each quarter piece 1102 of the feeding device 102. As shown from the underside of each quarter piece 1102, there may be a lip 1202 that protrudes downwardly from the hook piece 1104. To assemble the quarter pieces 1102 together, the user may position the hook piece 1104 such that the lip 1202 mates with a receiving space 1106 of another adjacent quarter piece 1102. When assembled, all the quarter pieces 1102 connect together by pairing the hook pieces 1104 with their corresponding receiving spaces 1106 on an adjacent quarter piece 1102.

FIGS. 8-12 provide examples of a feeding device 102 that is composed of multiple pieces. These are non-limiting examples as there may be other designs and forms for feeding device 102 that fit within the scope of the invention.

While not shown in FIGS. 1-12, it is noted that in other embodiments, there may be one or more handles positioned on the feeding device 102 so that a user can easily grasp the feeding device 102. The one or more handles may be grasped so as to position the feeding device 102 in the storage container 128 and over the surface 138 of the liquid syrup 136, as well as to remove the feeding device 102 when it is no longer needed in the storage container 128. In some embodiments, there may be a single handle positioned in the center of the feeding surface 104. In other embodiments, there may be two or more handles, with one handle positioned on each side of the feeding device 102 so that the user can place the feeding device 102 into and out of the storage container 128.

Figure 13:
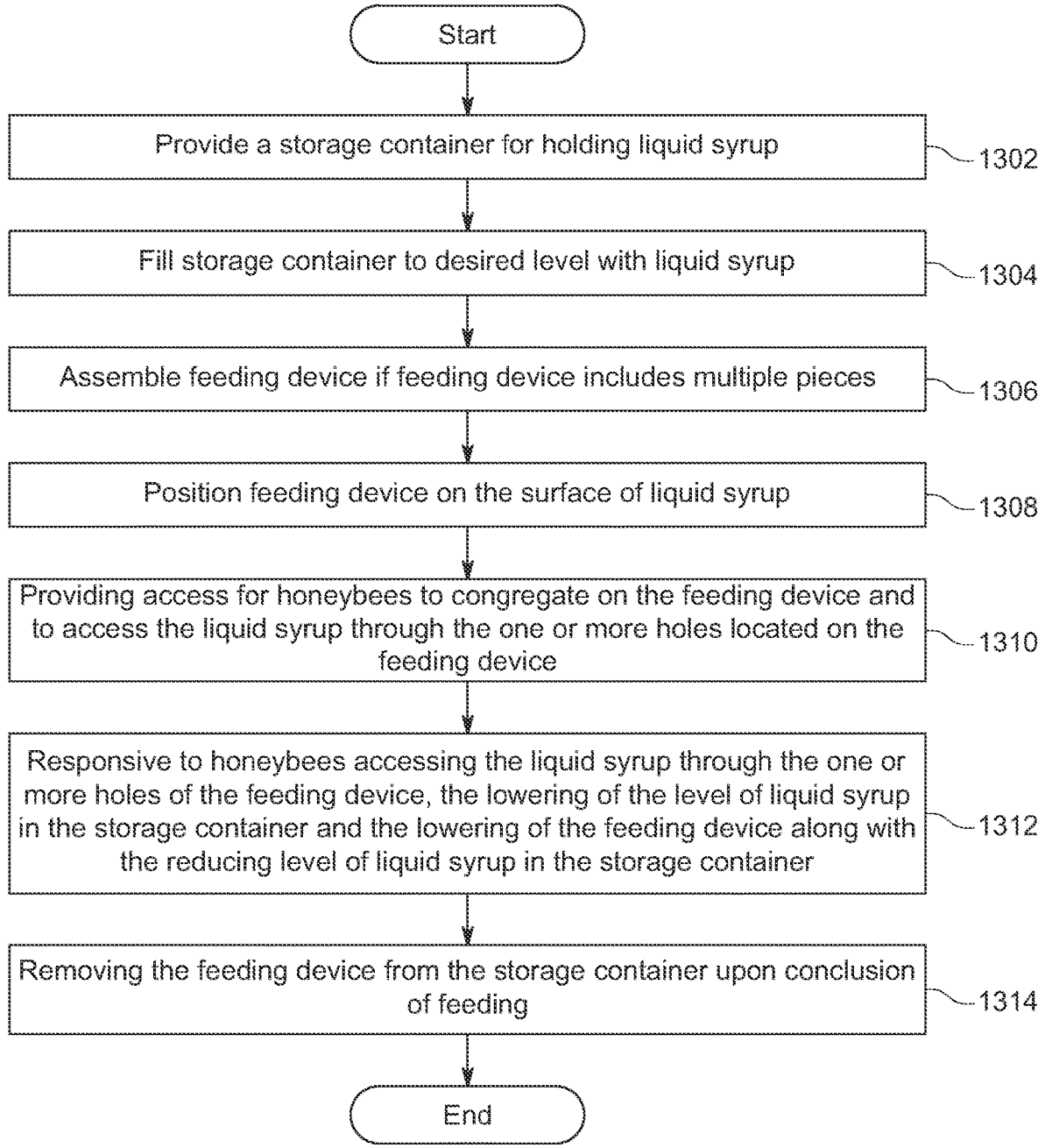
FIG. 13 is a flowchart for an exemplary method in accordance with an illustrative embodiment.

FIG. 13 is a flowchart for an exemplary method of using the feeding device 102 as described and shown in FIGS. 1-12. At step 1302, the method may begin with providing a storage container 128 for holding liquid syrup 136 in order to open feed honeybees 150 as shown in FIG. 1 and FIG. 7. Accordingly, the beekeeper or another person is responsible for providing the container 128 having an opening 130 at the top 140 of the container 128 and a closed bottom 132 as shown in FIG. 1. At step 1304, the storage container 128 may be filed to a desired level with liquid syrup 136. The beekeeper or other person may fill the container 128 with the appropriate amount of liquid syrup 136 to a desired level.

At step 1306, the feeding device 102 may be assembled by connecting one or more pieces together if the feeding device 102 includes multiple pieces (e.g., as shown in FIGS. 8-12). At step 1308, the feeding device 102 may be placed as a whole piece over the surface 138 of the liquid syrup 136. This step is applicable whether the feeding device 102 needs to be pre-assembled by connecting multiple pieces together or whether the feeding device 102 is already assembled into a single entity. Ultimately, the feeding device 102 is positioned as a single entity or whole piece over the surface 138 of the liquid syrup 136.

At step 1310, the method may include providing access for the honeybees to congregate or swarm onto the feeding device 102 and to access the liquid syrup 136 through the one or more holes 116 that are dispersed on the top surface 104 of the feeding device 102. Providing access may be accomplished by removing the lid (if applicable) from the container 128 or at least keeping the container 128 partially open and to the side so that the honeybees can smell the liquid syrup 136 inside of the container 128 and can begin to swarm over the feeding device 102.

At step 1312, responsive to the honeybees accessing the liquid syrup 136 through the one or more feeding holes or openings 116 dispersed over the feeding surface 104 of the feeding device 102, after some period of time, the level 138 of the liquid syrup 136 may automatically begin to lower as the honeybees begin feeding and consuming the liquid syrup 136 within the container 128. As the liquid syrup 136 begins to reduce and to lower down into the container 128 after some time, the feeding device 102 will also begin to lower down into the container 128 and over the surface 138 of the liquid syrup 136 concurrently or substantially simultaneously. This way the bottom surface 106 of the feeding device 102 stays in contact with the liquid syrup 136 thereby providing access to the honeybees to the liquid syrup 136, while also protecting the honeybees from contacting the liquid syrup 136 with their bodies.

At step 1314, the feeding device 102 is removed from the container 128 upon conclusion of feeding and when the beekeeper deems it is safe and appropriate to do so. The feeding device 102 may be used multiple times and for various occasions. Further, the feeding device 102 may be provided in appropriate sizes to suit multiple sizes and/or shapes of containers 128.

Accordingly, the present description provides for various embodiments for one or more feeding devices that may be used to open feed honeybees and to provide limited access to liquid syrup that will supplement their nutrition and will help prevent the honeybees from dying due to drowning or undesirable contact of their bodies with the liquid syrup. Many uses and advantages are offered by the feeding devices 102 as described above in one or more non-limiting embodiments in the present description.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A method of open feeding honeybees, the method comprising:
   providing a feeding device having a feeding surface, and a plurality of circular openings dispersed over the feeding surface, wherein the plurality of circular openings extend from the feeding surface through to a bottom surface of the feeding device, wherein each circular opening of the plurality of circular openings is positioned over a narrow channel, wherein each circular opening of the plurality of circular openings merges with the narrow channel, wherein the narrow channel is narrower than a width of the plurality of circular openings, and wherein the plurality of circular openings are unobstructed, and a raised wall area, wherein the feeding device has a circular profile, wherein the feeding device further comprises one or more ridges, wherein the one or more ridges are located between the raised wall area and the feeding surface, wherein the one or more ridges have a greater thickness than the raised wall area and the feeding surface of the feeding device, wherein an inner surface of the raised wall area is angled at an obtuse angle away from the one or more ridges of the feeding device and from the feeding surface, and wherein an outer surface of the raised wall area is angled at an obtuse angle outwardly and is inclined away from a bottom surface of the feeding device, wherein a thickness of the feeding device increases in a direction from the raised wall area towards the feeding surface;

placing the feeding device over a surface of liquid syrup located within a container, wherein the container has a circular profile, wherein the container is an open container having an opening at a top of the container suitable for open feeding, wherein the feeding device is placeable over a surface of the liquid syrup in the container and floats over the surface of the liquid syrup in the container, wherein the raised wall area comprises angled sides, wherein each outer surface of the angled sides abuts each inner wall of the container and prevents honeybees from falling into the container from the angled sides, and wherein a diameter of the feeding device has a diameter or width that fully extends between all sides of the container so as to avoid the honeybees falling off of a top rim of the raised wall area and into the liquid syrup;

allowing honeybees to feed on the feeding device, wherein the liquid syrup is accessible to the honeybees from the plurality of circular openings, wherein a body of each of the honeybees is prevented from drowning in or otherwise contacting the liquid syrup by the feeding device, and by the raised wall area, wherein the honeybees are able to stand on the raised wall area and walk down towards the feeding surface on the raised wall area and on the one or more ridges; and placing the feeding device in the container or any other container having a circular profile and having an opening at the top of the container or the any other container suitable for open feeding and the feeding device can fit snugly within the open container against all sides of the open container.

2. The method of claim 1, further comprising lowering of the feeding device within the container or the any other container as a level of the liquid syrup decreases within the container.

3. The method of claim 1, further comprising assembling one or more pieces of the feeding device together.

4. The method of claim 3, further comprising connecting two half pieces to assemble the feeding device.

5. The method of claim 3, further comprising connecting four quarter pieces to assemble the feeding device.

* * * * *